US006702023B1

(12) United States Patent
Harris et al.

(10) Patent No.: US 6,702,023 B1
(45) Date of Patent: Mar. 9, 2004

(54) METHOD FOR TREATMENT OF UNDERGROUND RESERVOIRS

(75) Inventors: Ralph Edmund Harris, Horsham (GB); Ian Donald McKay, Yateley (GB)

(73) Assignee: Cleansorb Limited, Hampshire (GB)

( * ) Notice: Subject to any disclaimer, the term of this patent is extended or adjusted under 35 U.S.C. 154(b) by 0 days.

(21) Appl. No.: 10/019,489

(22) PCT Filed: Mar. 7, 2000

(86) PCT No.: PCT/GB00/02558

§ 371 (c)(1),
(2), (4) Date: Jan. 29, 2002

(87) PCT Pub. No.: WO01/02698

PCT Pub. Date: Jan. 11, 2001

(30) Foreign Application Priority Data

Jul. 2, 1999 (GB) .............................................. 9915354

(51) Int. Cl.⁷ .......................... E21B 43/27; E21B 43/22
(52) U.S. Cl. ..................... 166/307; 166/300; 166/312; 507/267; 507/260
(58) Field of Search .................. 166/300, 307, 166/312, 311, 305.1; 507/267, 260, 271, 272, 201, 203

(56) References Cited

U.S. PATENT DOCUMENTS

| 2,221,353 A | * | 11/1940 | Limerick et al. ............ 166/300 |
| 3,630,285 A | | 12/1971 | Claytor et al. |
| 3,704,750 A | * | 12/1972 | Miles et al. ................. 166/279 |
| 3,868,998 A | | 3/1975 | Lybarger et al. |
| 3,929,192 A | * | 12/1975 | Friedman ..................... 166/300 |
| 3,938,593 A | * | 2/1976 | Friedman ..................... 166/307 |
| 3,953,340 A | * | 4/1976 | Templeton et al. .......... 507/203 |
| 4,122,896 A | * | 10/1978 | Scheuerman et al. ....... 166/307 |
| 4,313,834 A | * | 2/1982 | Harris ......................... 507/215 |
| 4,410,625 A | | 10/1983 | Cadmus |
| 4,512,407 A | * | 4/1985 | Friedman ..................... 166/295 |
| 4,682,654 A | | 7/1987 | Carter et al. |
| 4,690,891 A | | 9/1987 | Hou et al. |
| 4,886,746 A | | 12/1989 | Cadmus et al. |
| 4,996,153 A | | 2/1991 | Cadmus et al. |
| 5,032,297 A | | 7/1991 | Williamson et al. |
| 5,067,566 A | | 11/1991 | Dawson |
| 5,082,056 A | | 1/1992 | Tackett, Jr. |
| 5,165,477 A | | 11/1992 | Shell et al. |
| 5,201,370 A | | 4/1993 | Tjon-Joe-Pin |
| 5,223,159 A | | 6/1993 | Smith et al. |
| 5,224,544 A | | 7/1993 | Tjon-Joe-Pin et al. |
| 5,226,479 A | | 7/1993 | Gupta et al. |
| 5,247,995 A | | 9/1993 | Tjon-Joe-Pin et al. |
| 5,421,412 A | | 6/1995 | Kelly et al. |
| 5,437,331 A | | 8/1995 | Gupta et al. |
| 5,441,109 A | | 8/1995 | Gupta et al. |
| 5,476,775 A | | 12/1995 | Fodge et al. |
| 5,547,026 A | | 8/1996 | Brannon et al. |
| 5,551,515 A | | 9/1996 | Fodge et al. |
| 5,562,160 A | | 10/1996 | Brannon et al. |
| 5,566,759 A | | 10/1996 | Tjon-Joe-Pin et al. |
| 5,604,186 A | | 2/1997 | Hunt et al. |
| 5,678,632 A | * | 10/1997 | Moses et al. ................ 166/307 |
| 6,138,753 A | * | 10/2000 | Mohaupt ................. 166/250.02 |
| 6,143,698 A | * | 11/2000 | Murphey et al. ........... 507/145 |

FOREIGN PATENT DOCUMENTS

| WO | 94 01654 A | 1/1994 |
| WO | 94 25731 A | 11/1994 |
| WO | 98 20230 A | 5/1998 |

* cited by examiner

*Primary Examiner*—David Bagnell
*Assistant Examiner*—T. Shane Bomar
(74) *Attorney, Agent, or Firm*—Nixon & Vanderhye P.C.

(57) ABSTRACT

A method for treating an underground reservoir, which method comprises introducing into the reservoir a treatment fluid comprising, dissolved or dispersed in water, an ester and a non-enzyme catalyst capable of increasing the rate of hydrolysis of the ester, such that the ester hydrolyses to produce an organic acid to dissolve acid soluble material present within the reservoir.

45 Claims, No Drawings

METHOD FOR TREATMENT OF UNDERGROUND RESERVOIRS

This application is the US national phase of international application PCT/GB00/02558 filed Jul. 3, 2000, which designated the US.

The method of the present invention is generally applicable to the production of oil, gas or water from wells drilled into underground reservoirs.

During drilling, workover and production operations there are numerous situations where the production rate of an oil, gas or water well following these operations is limited due to the presence of formation damage. Types of damage include, but are not limited to, the presence of polymer-containing filter cakes including drilling mud filter cakes, fluids (including hydraulic fracturing fluids) filtrates or residues including polysaccharide-containing filter cakes, fluids, filtrates or residues, particulate materials such as fluid loss control agents and rock fines, biofilms, scales and asphaltenes. Damage may arise as a result of drilling, production, injection workover or other oilfield operations.

Damage can be near wellbore, for example the presence of drilling mud or fracturing fluid filter cake, or damage may be present deeper into the formation, for example mineral scale deposited in natural or induced fractures or in the rock matrix.

The effective removal of damage, especially near wellbore damage such as filter cake, can significantly increase the production rate of hydrocarbon or water producing wells penetrating underground formations. The effective removal of damage can also increase the injectivity of injection wells, Conventional acids have been used for many years to treat damage in underground formations and stimulate the rate of oil or gas production. However, conventional acids have several drawbacks. They react rapidly with acid soluble materials which can prevent effective placement of reactive acid deep into carbonate formations or throughout long horizontal wellbores resulting in poor zonal coverage. These acids are also hazardous in use. To improve zonal coverage the use of high pressure, high rate injection is often attempted, which increases the hazards associated with their use of conventional acids. Due to the high corrosivity of conventional acids the use of corrosion inhibitors is also generally required. There is a greater need for corrosion inhibitors in higher temperature formations and corrosion inhibitors are generally toxic.

If acids can be delivered sufficiently well into the formation, acidising may also be effective in stimulating undamaged formations by increasing the permeability of the rock matrix around the wellbore. For example, increasing the permeability of a zone of 3 to 5 m radius around a vertical wellbore by 3–4 fold is expected to increase the rate of fluids production (or injection rate) by about 20% in a situation where there is no near wellbore damage. The efficient delivery of acids into fractures such as induced fractures or natural fractures can also increase the conductivity of the fractures allowing higher rates of fluid production or injection.

Acids may also be used to break acid sensitive gels such as cross linked guar-borate gels used in hydraulic fracturing and other oilfield applications. Efficient breaking of gels is generally required to obtain maximum production after such treatments.

One approach which can improve zonal coverage has been the use of solutions of carboxylic acid esters which hydrolyse at high temperatures to produce a carboxylic acid (U.S. Pat. No. 3,630,285). Preferably, the formation temperature for this process is greater than about 150° C. Because the acid is produced predominantly after placement of the fluid excellent zonal coverage can be achieved. The preferred esters used in U.S. Pat. No. 3,630,285 were ethyl acetate and methyl formate. These compounds have the disadvantage of low flash points and have other health and safety drawbacks such as some degree of toxicity.

It is an object of the present invention to provide simple and effective methods for increasing the rate of hydrolysis of esters to allow ester based acidising of underground formations to be carried out within a reasonable time scale. It is a further object of the present invention to provide simple and effective methods for acidising underground formations in combination with one or more polymer breakers.

It is also an object of the present invention to provide a method by which increased rates of ester hydrolysis can be obtained in heavy brines.

The present invention further provides a method by which controlled acidising, with or without suitable polymer breakers, may be used for the treatment of filter cakes following gravel packing operations, by incorporation of suitable components into the gravel packing fluid.

Accordingly, the present invention provides a method for treating an underground reservoir, which method comprises introducing into the reservoir a treatment fluid comprising, dissolved or dispersed in water, an ester and a non-enzyme catalyst capable of increasing the rate of hydrolysis of the ester, such that the ester hydrolyses to produce an organic acid to dissolve acid soluble material present within the reservoir.

The reservoir may be a hydrocarbon reservoir, for instance a gas or oil reservoir. Alternatively the reservoir may be a water reservoir. When it is a hydrocarbon reservoir the method of the invention may further include recovering a hydrocarbon from the treated reservoir. Likewise, when it is a water reservoir the method of the invention may further include recovering water from the treated reservoir. Typically the reservoir is, or includes, a carbonate rock structure.

Preferred esters for incorporation into treatment fluids to be used in the present invention are carboxylic acid esters, preferably those with low toxicity, high flash point and high environmental acceptability. Esters of ethanoic and methanoic acid (acetic and formic acid) are particularly suitable. The calcium and magnesium salts of these acids have good solubility in water.

The ester should be at least slightly water soluble. Preferably the ester should be soluble to at least 1% w/v in water and most preferably soluble to at least 5% in water. The solubility of some esters may be less in high salt concentration fluids, such as a heavy brine. In such cases an ester which is completely soluble in the base fluid at the desired concentration will normally be selected.

The acid generated in situ according to the method of the present invention is an organic acid, generally an aliphatic carboxylic acid. Preferably the acid is of formula $RCO_2H$ wherein R is hydrogen, an alkyl group having from 1 to 6 carbon atoms or —$R'$—$CO_2H$ where $R'$ is a bond or an alkylene group having from 1 to 6 carbon atoms, the said alkyl or alkylene group being unsubstituted or substituted by halogen or hydroxy. Where the acid has a hydroxy substituent the ester may, for instance, be a cyclic ester such as a lactone.

The alcohol portion of the ester may be monohydric or polyhydric as long as the esters are sufficiently water soluble at formation temperatures. Partial esters of the polyhydric alcohols can be used in which case the unesterified hydroxyl groups serve to increase the water solubility of the ester.

Suitable examples of the ester include 1,2,3-propanetriol triacetate, 1,2,3-propanetriol diacetate, ethylene glycol diacetate, diethylene glycol diacetate and triethylene glycol diacetate. Most preferably the esters are acetic esters of 1,2,3-propanetriol (glycerol) and 1,2-ethanediol (ethylene glycol). The ester and also the alcohol which is produced when the ester hydrolyses can both act as mutual solvents. The presence of a mutual solvent is generally considered to be beneficial in treatments of hydrocarbon bearing formations, particularly when treating with water based treatment fluids.

The concentration of ester incorporated into the formulations of the present invention will typically be at least 1% w/v but may be up to 20% w/v or higher. In general it has been found that 5% to 10% w/v ester when used in combination with a suitable polymer breaker or breakers is sufficient to give good removal of damage caused by filter cake. Preferably 5% to 20% ester will be used.

The catalyst is any non-enzyme catalyst capable of increasing the rate of hydrolysis of the ester. Catalysis is most simply achieved with (i) a suitable metal ion or ions, particularly transition metal ions, for instance used as simple solutions of metal salts (ii) a suitable organic molecule or molecules or (iii) suitable complexes of a metal ion or metal ions with an organic molecule or organic molecules. Accordingly, in one aspect of the invention the catalyst is, or comprises, a metal ion such as a transition metal ion. In another aspect of the invention the catalyst is, or comprises, an organic molecule. Typically the catalyst is formed from a combination of a metal ion, for instance a transition metal ion, and an organic molecule.

Suitable metal ions include any metal ion which can increase the rate of hydrolysis of a suitable ester either alone or in combination with a suitable organic molecule or molecules. Preferred metals are transition metals, in particular zinc, copper, nickel, cobalt, iron, manganese, chromium, vanadium, titanium, scandium or molybdenum Most preferred are sufficiently water soluble salts or complexes of copper, zinc, iron, manganese, nickel and molybdenum.

Suitable organic molecules include any organic molecule which can increase the rate of hydrolysis of a suitable ester either alone or in combination with a suitable metal ion or ions. Preferred organic molecules are amino acids, peptides, monosaccharides, oligosaccharides, nucleic acids and peptide nucleic acids, or modified or cyclic amino acids, peptides, monosaccharides, oligosaccharides, nucleic acids and peptide nucleic acids, or other small organic molecules.

The organic molecules may be chemically modified, for example by derivatisation, to alter their solubility, binding properties (with respect to the metal ions, esters or products of ester hydrolysis) or, where a complex is the active catalyst, to alter other characteristics of the complexes.

Where the organic molecule is used in combination with a metal ion, an ability of the organic molecule to form a coordination complex with a metal ion is generally desirable. Suitable complexes of a metal ion or metal ions with an organic molecule or organic molecules include any complex which can increase the rate of hydrolysis of a suitable ester.

Catalysts which are particularly valuable are those catalysts where the products of ester hydrolysis are not strongly bound to the catalyst allowing the continuing hydrolysis of further ester molecules.

More than one metal ion and/or organic molecule may be used at the same time. Combinations of metal ions and/or organic molecules which are effective for ester hydrolysis can be selected by a person of skill in the art. In general catalysts will be selected on the basis of their effectiveness at hydrolysing the preferred esters under the required conditions, their cost and their environmental and operational acceptability.

The catalyst will normally be incorporated into the treatment fluid at a concentration sufficient to increase the rate of ester hydrolysis by a factor of at least two fold and preferably 5 to 10 fold above the uncatalysed rate of hydrolysis of the ester. Concentrations of catalyst of 1 to 10 mM with respect to the metal or organic molecule content of the catalyst are generally sufficient, although higher or lower concentrations may be used.

The treatment fluid needs to be retained in the underground reservoir for a period long enough for the desired amount of acid to be produced. Ester hydrolysis in the absence of catalysis proceeds slowly, especially at low temperatures. For example at 10–40° C. the hydrolysis may take several weeks. This may be acceptable for some applications such as filter cake removal from a well which has been drilled but which is shut in for an extended time (of at least several weeks) before being put on production. However, generally shorter treatment periods are sought. The treatment fluids used in the method of the present invention will normally require shut in periods of a maximum of 7 days but normally less than 3 days.

In addition to the preferred esters which would normally comprise the majority of the esters present in the treatment fluids used in the current invention, it may also be beneficial in some damage removal applications to include in the formulation esters of chelating compounds such as malonic acid, oxalic acid or succinic acid (U.S. Pat. No. 5,082,056) ethylenediaminetetraacetic acid (EDTA) nitrilotriacetic (NTA) citric acid or hydroxyacetic acid (U.S. Pat. No. 5,223,159) which hydrolyse to produce efficient chelating compounds. Such compounds may be particularly useful to assist in the breaking of cross-linked polymers in combination with other polymer breakers. Some of the acids produced from the hydrolysis of the ester may be able to dissolve certain types of oilfield scale. For example hydroxyacetic acid can dissolve calcium sulphate.

Although it is essential to the method of the present invention to use a non-enzyme catalyst to hydrolyse the ester, there may be circumstances in which such a catalyst is used in combination with an enzyme capable of hydrolysing an ester.

In one embodiment of the invention the treatment fluid further includes a polymer breaker to degrade polymers. Preferred polymer breakers for use in the method of the present invention are oxidants (oxidative breakers), enzyme breakers and catalysts.

Oxidative breakers used in the present invention may be any one of those oxidative breakers known in the art to be useful to react with polysaccharides to reduce the viscosity of polysaccharide thickened compositions or to disrupt filter cakes.

The oxidative breaker is typically introduced in a treatment fluid containing the ester component. The oxidative breaker may be present in solution or as a dispersion. Suitable compounds include persulphates, peroxides, perborates, percarbonates, perphosphates, hypochlorites, persilicates, metal cations and hydrogen peroxide adducts such as urea hydrogen peroxide and magnesium peroxide.

Preferred oxidative breakers for incorporation into treatment fluids to be used in the present invention are peroxides which can decompose to generate hydrogen peroxide. Of the oxidative breakers most preferred are percarbonates and perborates, most especially sodium percarbonate and sodium perborate.

A preferred polymer breaking enzyme used in the present invention includes a hydrolase, such as any one of those polysaccharide degrading enzymes known in the art to be useful to hydrolyse polysaccharides and to reduce the viscosity of polysaccharide thickened compositions or to disrupt filter cakes. The polymer breaking enzymes will be selected on the basis of their known ability to hydrolyse the polysaccharide components known or believed to be contributing to the damage. Examples of suitable enzymes which may be used to break polymers include enzymes which can hydrolyse starch, xanthan, cellulose, guar, scleroglucan, succinoglycan or derivatives of these polymers. If suitable enzyme activities are available, enzymes could also be used to hydrolyse any other polymers suitable for use in drilling, workover or production operations. There is an extensive patent literature relating to polysaccharide degradation by enzymes in oilfield applications (for background and details of specific enzymes see U.S. Pat. Nos. 5,165,477, 5,226,479, 5,247,995, 5,437,331, 5,441,109, 5,562,160, 5,604,186, 5,224,544, 5,476,775, 5,566,759, 4,682,654, 5,067,566, 5,201,370, 5,421,412, 5,547,026, 5,551,515, 4,410,625, 4,690,891 4,886,746, 4,996,153 and 5,032,297)

Any catalyst used in the method of the present invention which is capable of hydrolysing an ester may also be used as a polymer breaker, in which case it needs to exhibit hydrolytic ability against the chemical bonds in a polymer. Thus, in one aspect of the invention the polymer breaker is a non-enzyme catalyst capable of increasing the rate of hydrolysis of the polymer. Suitable catalysts will be selected on the basis of their effectiveness at hydrolysing the preferred polymers under the required conditions, their cost and their environmental and operational acceptability.

Oxidative or enzyme breakers or catalysts may also be used to hydrolyse other, non-polysaccharide polymers which may be incorporated into fluids for drilling workover or production operations.

Where a breaker is incorporated into the treatment fluid, sufficient polymer breaker or gel breaker is normally included to have a substantive effect on the polymer component. The concentration of polymer breaker incorporated into the formulation will vary according to the type of breaker employed, the nature of the polymer and its concentration in the base fluid but will be of the order of 0.005 to 60 kg/m$^3$, preferably 0.2 to 10 kg/m$^3$.

In general it is desirable to use a concentration of breaker which results in the breaking of the polymer over a period of several hours to allow the effective placement of the treatment fluid. For example, too rapid a degradation of a filter cake or biofilm may lead to early localised fluid leak off, adversely affecting placement of the remaining treatment fluid. This is analogous to the situation experienced in treatments using conventional acids, where the fast reaction rate can result in rapid breakthrough and wormholing and uneven fluid leak off. This can prevent the even placement of fluid over long horizontal intervals or into fractures or the rock matrix. It is a feature of the treatment fluids used in the present invention that use of an ester rather than a reactive acid avoids wormholing and improves the placement of the fluid. In order to maintain this advantage in certain applications such as the treatment of long horizontal intervals, too rapid a degradation of polymers in for example filter cakes or biofilms should in general be avoided. Ideally, breakthrough of filter cakes or biofilms will be achieved after a period longer than that amount of time needed to place the treatment fluid throughout the zone requiring treatment. A delay in producing a substantive amount of acid and in breaking polymer allows even treatment of the target zone and excellent zonal coverage.

Use of an ester gives the advantages described in U.S. Pat. Nos. 3,630,285 and 5,678,632 with respect to effective placement of the fluid and avoidance of the use of corrosion inhibitors. Where suitable esters are selected, in particular where low toxicity, high flash point esters are used, there are also health and safety and environmental advantages. The initially neutral or slightly acidic pH of the fluid permits the incorporation of gel breakers such as enzymes and oxidative breakers into the fluid without the compatibility problems encountered when such breakers are incorporated into highly acidic formulations based on mineral or organic acids.

It is preferable to use breakers which are activated by, or whose activity is enhanced by, the change in conditions as the ester hydrolyses to produce acid. For example, peroxides which are activated by the development of acidic conditions or enzymes which have their activity enhanced by the development of acidic conditions. An example of the former is the decomposition of calcium peroxide. This decomposes under acidic conditions to generate hydrogen peroxide.

Enzymes useful as polysaccharide breakers generally have a pH optimum in the range pH 3 to pH 7. Such enzymes will therefore have their activity enhanced by the generation of the moderately acidic conditions arising from hydrolysis of an ester. The generation of acidic conditions by the hydrolysis of esters in the presence of acid soluble material such as calcium or magnesium carbonates results in the formation of a self-regenerating buffer. For example, the production of acetic acid will produce an acetic acid-acetate buffer or production of formic acid a formic acid-formate buffer. If the produced acid reacts with acid soluble material it is replenished by more acid produced from the hydrolysis of remaining ester precursor ensuring maintenance of the buffer. This can provide ideal conditions for polysaccharide degrading enzymes causing less of the enzyme or enzymes to be needed to give the same degree of polymer breaking compared to the same enzymes working under sub-optimal pH conditions. The continual production of acid and maintenance of a buffer system in the method of the present invention even when the produced acid reacts with acid soluble material, ensures favourable pH conditions for enzyme breaker activity are maintained over a prolonged period. This contrasts with standard buffer fluids which contain a low concentration of acid or formulations which produce low concentrations of acid from precursors. In both these cases the acid will react with acid soluble material and will not be replenished. Any enzyme breakers present in this fluid will only operate at a favourable pH for a short period of time before the acid is spent and the pH becomes more alkaline.

In some embodiments of the present invention the effectiveness of the incorporated oxidant breakers can be enhanced by producing more reactive oxidants. Specifically, under certain conditions the production of hydrogen peroxide in the presence of organic acid can result in the formation of a peracid which is a more effective oxidant than the hydrogen peroxide. Thus, in one embodiment of the method of the invention the treatment fluid further comprises a peroxide to generate a peracid polymer breaker in situ.

The ester and other chemicals required for the process of the present invention will normally be technical grade to reduce the cost of the process.

Where an enzyme is used to hydrolyse an ester or as a polymer breaker, it is necessary to select an enzyme which remains active in the treatment fluid under reservoir conditions for at least as long as the catalytic activity is needed. It is generally advantageous for the enzymes to be readily water soluble although the enzymes may also be active and be used in low water activity environments or two-phase systems such as emulsions or dispersions.

Typically, isolated enzymes are used. Enzymes may be isolated from plant, animal, bacterial or fungal sources. The enzymes may be produced from wild-type, conventionally bred, mutated or genetically engineered organisms. The enzymes may, optionally, be chemically modified, as long as they retain or possess the desired catalytic ability. Preferably, the enzymes will be industrial enzymes available in bulk from commercial sources.

A treatment fluid is chosen to reflect the requirements of the treatment, such as amount of acid required, rate of production of acid required, type of breaker needed, and the conditions of the reservoir, in particular the ionic strength and temperature.

The chosen treatment fluid is normally prepared in suitable water for example city (drinking) water, produced water or sea water although in some situations it may be desirable to inject undiluted ester or a blend of ester with a hydrocarbon such as diesel. containing the other components. Typically an ester solution is prepared batchwise in tanks or other suitable vessels by adding the ester to the water with agitation and achieving thorough mixing by recirculating the ester solution through a blender such as a paddle blender for a suitable period of time. In some circumstances, use of an emulsion of the ester may be desirable. The other components (catalyst or catalysts and breaker or breakers) are then added and recirculation continued. If batch wise preparation is not possible or desirable (for example if a dispersion is used which is difficult to keep evenly dispersed in a large holding vessel) or if it is preferred the treatment fluid may be prepared by adding individual components to the water on a continuous, preferably carefully controlled and monitored basis ("on the fly") as the treatment fluid is injected into the underground reservoir. Other methods of preparing the chosen treatment fluid will be well known to those skilled in the art.

The concentrations of ester, catalyst and optional additional components such as breakers in the treatment fluid will be selected according to the requirements of the treatment. Concentrations will typically be of the order of 10 to 200 grams of ester per litre of base fluid, 1 to 10 mM catalyst (with respect to the metal ion or organic molecule concentration) and 0.2 to 10 grams per litre of other components, although higher or lower concentrations may be appropriate in some situations. The concentration of any enzyme breaker will be selected such that the polymer/gel will be degraded within the desired period of time. Where enzymes are used, typical enzyme concentrations will be 0.05% to 5% v/v of commercial liquid enzyme preparations or about 0.005 to 0.5% v/v of dried enzyme preparation. Preferably liquid preparations of enzymes will be used for ease of handling.

More than one ester may be incorporated into the treatment fluid depending on the nature of the damage and the type of treatment. Similarly more than one type of catalyst and polymer breaker may be incorporated into the treatment fluid. Where an enzyme preparation is included in the treatment fluid more than one enzyme preparation may be incorporated. A single solution containing all of the components will preferably be used. In one embodiment the treatment fluid further includes an esterase, lipase or protease enzyme. These serve to increase the rate of hydrolysis of the ester.

In some embodiments of the present invention, it may be desirable to incorporate more than one type of breaker, for example an oxidant might be used in combination with an enzyme breaker in the case where two polysaccharides are present but only one is amenable to attack by an enzyme breaker.

Oxidants, enzymes and catalysts may, if desired, also be used in the form of delayed release preparations, such as will be well known by those skilled in the art.

The treatment fluid comprising ester, catalyst and optional polymer breakers is conveniently introduced into the underground formation via injection or production wells. If being introduced into a newly drilled well, particularly if being used to remove damage caused during drilling, such as filter cakes, the treatment fluid may conveniently be introduced via the drill string. This is achieved using the mud pumps. The low corrosivity of the fluid will permit introduction of the fluid into wells or the drill string without the need to add corrosion inhibitors. The fluid will normally be introduced at below fracture pressure but may if desired be injected at above fracture pressure.

The treatment fluid may contain further chemical additives such as are commonly used in the oil industry, such as surfactants, foaming and chelating agents if their inclusion is deemed to be beneficial and if they are compatible with the other components of the treatment fluid.

The treatment fluid may be introduced into the reservoir via a wellbore which extends into the reservoir. The wellbore may be vertical, deviated, inclined or horizontal. For near wellbore treatments, the volume of treatment fluid introduced into the reservoir will typically be at least equal to the wellbore volume plus an allowance for some leak off into the formation. A fluid volume of between 120% and 200% of the wellbore volume will normally be used although if a high rate of fluid loss is expected a volume up to 300% or higher of the well bore volume may be selected. For treatments where the target is damage deeper into the formation such as damage within natural or induced fractures or damage within fracture networks a volume of treatment fluid will be selected appropriate to the requirements of the treatment.

In one embodiment of the present invention, a volume of the treatment fluid, containing both ester and catalyst, which is sufficient to allow the fluid to penetrate one to several metres into a formation around a wellbore or behind a fracture face may be used. The production of acid in-situ can result in an increase in the matrix permeability of a carbonate formation to a depth of one to several metres. Where damage is also removed from the near wellbore region or the fracture faces this will result in a negative skin which will increase the productivity of the well beyond that which can be achieved with even complete near wellbore damage removal. The volume of fluid needed for such treatments will depend on the porosity of the formation, desired depth of penetration and dimensions of the wellbore, fracture or fracture network. Such an approach may also be effective for treating carbonate scaled sandstone reservoirs which also suffer from near wellbore damage, again using a single stage treatment.

In another embodiment of the present invention the ester, catalyst and optional polymer breakers are used to remove filter cake in gravel packing operations. In such operations it is generally acknowledged that it is important to retain a filter cake during placement of the gravel pack. The effective removal of the filter cake after placement of the gravel pack is required in order to ensure high productivity from the gravel packed well. The ester, catalyst and optional polymer breakers may be incorporated into the base fluid used to place gravel for gravel packing operations or placed in the gravel packed well following the treatment. In-situ production of acid within the gravel pack fluid using catalysts ensures that acid is delivered evenly to all parts of the gravel pack adjacent to the filter cake resulting in an even clean up of filter cake.

The well will normally be shut in after introduction of the treatment fluid for a period, typically between 2 hours and a week, preferably 6–48 hours, to allow production of acid and breaking of the polymer. The well is then put on or returned to production, or in the case of injection wells, put on injection. In some cases it may be desirable to leave the well shut in for a prolonged period of time, from several months to a year, following the treatment, before commencing production or water injection Some oilfield brines already contain metal ions which may be effective for increasing the rate of hydrolysis of esters, either alone or in combination with an organic molecule or molecules. In some embodiments of the present invention it may therefore be possible to incorporate into the brine esters alone, or esters and if needed a suitable organic molecule or molecules capable of forming complexes with the metal ions present in the brines, to obtain useful rates of ester hydrolysis and acid production without having to add metal ions to the formulation. Similarly, some formations already contain metal ions which may be effective for increasing the rate of hydrolysis of esters, either alone or in combination with an organic molecule or molecules.

It is also possible to introduce the treatment fluid into the reservoir via coiled tubing or via bullheading of fluid. Irrespective of how the treatment fluid is introduced, it is possible for one or more components of it (the ester, the catalyst and/or the optional polymer breaker) to be in the form of a delayed release preparation.

The object of the method of the invention may, for instance, be to increase the rate of production of wells drilled into the formation, to increase the permeability of the formation, to remove filter cake, in particular following a gravel packing operation, or to remove a biofilm.

The present invention has the following particular advantages: The method provides a simple, effective and convenient way to acidise underground formations using a single fluid. The method may be used to increase the rate of ester hydeolysis to achieve acidising within a reduced period of time in situations where an enzyme is not effective due to temperature limitations or incompatibility with the base fluid, where use of an enzyme is not cost effective or where faster rates of ester hydrolysis in the absence of enzymes are sought.

The method also allows the successful incorporation of oxidant catalyst or enzyme polymer breakers into a treatment fluid able to deliver a high concentration of acid. Because the acid is present in a non,acidic precursor form, the breakers are not inactivated, as many would be by contact with conventional acids, and the activity of certain breakers is subsequently enhanced by the onset of moderate acidic conditions. This takes place after placement of the fluid, ensuring that both the acid and the breaker are delivered where they are needed.

As well as near wellbore or fracture face damage-removal the treatment fluid can also be used to achieve deep matrix stimulation during the same treatment. Because the fluid is essentially non-reactive when placed, excellent zonal coverage can be achieved.

Also the method is generally a very low hazard method compared to previous methods aiming to achieve a substantive degree of acidising. The method uses high flash point esters. There is generally no need for high pressure, high rate injection.

The components of the system are generally environmentally acceptable. The esters and enzymes and certain oxidant components such as the percarbonates are of low environmental impact. Also, the fluids are not highly corrosive, meaning that the use of corrosion inhibitors is generally not required which gives additional environmental benefits.

The following example illustrates the invention.

EXAMPLE 1

The effect of incorporating copper chloride dihydrate at 0.1% w/v on the rate of hydrolysis of a 5% w/v solution of triacetin in water at 90° C. in the presence of excess calcium carbonate was investigated. Acid production was measured indirectly by spectrophotometric determination of the calcium content of the solution, which increases as acid is produced from the hydrolysis of the ester and dissolves the calcium carbonate.

The rate of hydrolysis in the presence of the copper was approximately 2.5 to 3 times the rate of hydrolysis in the absence of the copper salt, allowing complete hydrolysis of the ester in about 48 hours against 5 to 6 days in the absence of the catalyst.

What is claimed is:

1. A method for treating an underground reservoir, which method comprises introducing into the reservoir a treatment fluid comprising, dissolved or dispersed in water, an ester and a non-enzyme catalyst capable of increasing the rate of hydrolysis of the ester, such that the ester hydrolyses to produce an organic acid in situ to dissolve acid soluble material present within the reservoir.

2. A method according to claim 1 wherein the fluid further includes a polymer breaker to degrade polymers.

3. A method according to claim 2 wherein the polymer breaker is a hydrolase enzyme.

4. A method according to claim 3 wherein the polymer breaker is a polysaccharide hydrolysing enzyme.

5. A method according to claim 4 wherein the polymer breaker is an enzyme which can hydrolyse starch, xanthan, cellulose, guar, scleroglucan or succinoglycan or derivatives of these polymers.

6. A method according to claim 2 wherein the polymer breaker is an oxidant.

7. A method according to claim 6 wherein the polymer breaker is a persulphate, hypochlorite, peroxide, perborate, percarbonate, perphosphate, persilicate, a metal cation or a hydrogen peroxide adduct.

8. A method according to claim 7 wherein the hydrogen peroxide adduct is urea hydrogen peroxide or magnesium peroxide.

9. A method according to claim 2 wherein the polymer breaker is a non-enzyme catalyst capable of increasing the rate of hydrolysis of the polymer.

10. A method according to claim 1 wherein the underground reservoir is a hydrocarbon reservoir.

11. A method according to claim 10 which further comprises recovering a hydrocarbon from the treated reservoir.

12. A method according to claim 10 wherein the hydrocarbon is oil.

13. A method according to claim 10 wherein the hydrocarbon is a gas.

14. A method according to claim 1 wherein the underground reservoir is a water reservoir.

15. A method according to claim 14 which further comprises recovering water from the treated reservoir.

16. A method according to claim 1 wherein the ester is a carboxylic acid ester.

17. A method according to claim 1 wherein the ester is an ester of an aliphatic carboxylic acid of formula $RCO_2H$ wherein R is hydrogen, an alkyl group having from 1 to 6 carbon atoms or —R'—$CO_2H$ where R' is a bond or an alkylene group having from 1 to 6 carbon atoms, the said alkyl or alkylene group being unsubstituted or substituted by halogen or hydroxy.

18. A method according to claim 1 wherein the ester is 1,2,3-propanetriol triacetate, 1,2,3-propanetriol diacetate, ethylene glycol diacetate, diethylene glycol diacetate or triethylene glycol diacetate.

19. A method according to claim 1 wherein the catalyst is a metal ion.

20. A method according to claim 1 wherein the catalyst is a transition metal ion.

21. A method according to claim 20 wherein the transition metal is zinc, copper, nickel, cobalt, iron, manganese, chromium, vanadium, titanium, scandium or molybdenum.

22. A method according to claim 1 wherein the catalyst comprises a metal ion.

23. A method according to claim 1 wherein the catalyst comprises a transition metal ion.

24. A method according to claim 1 wherein the catalyst is an organic molecule.

25. A method according to claim 24 wherein the organic molecule is an amino acid, peptide, monosaccharide, oligosaccharide, tucleic acid or peptide nucleic acid or a modified or cyclic amino acid, peptide, monosaccharide, oligosaccharide, nucleic acid or peptide nucleic acid.

26. A method according to claim 1 wherein the catalyst comprises an organic molecule.

27. A method according to claim 1 wherein the catalyst is formed from a combination of a metal ion and an organic molecule.

28. A method according to claim 1 wherein the catalyst is formed from a combination of a transition metal ion and an organic molecule.

29. A method according to claim 1 wherein the treatment fluid further comprises a peroxide to generate a peracid polymer breaker in situ.

30. A method according to claim 1 wherein the treatment fluid is introduced into the reservoir via a wellbore which extends to the reservoir.

31. A method according to claim 30 wherein the wellbore is vertical, deviated, inclined or horizontal.

32. A method according to claim 1 wherein the treatment fluid is introduced into the reservoir via the drillstring.

33. A method according to claim 1 wherein the treatment fluid is introduced into the reservoir via coiled tubing.

34. A method according to claim 1 wherein the treatment fluid is introduced into the reservoir via bullheading of the fluid.

35. A method according to claim 1 wherein one or more components of the treatment fluid is in the form of a delayed release preparation.

36. A method according to preceding claim 1 which comprises introducing the treatment fluid into the reservoir by injecting it at a rate below the reservoir fracture pressure.

37. A method according to claim 1 which comprises introducing the treatment fluid into the reservoir by injecting it at a rate above the reservoir fracture pressure.

38. A method according to claim 1 wherein the reservoir is or includes a carbonate rock structure.

39. A method according to claim 1 wherein the object of the treatment is to increase the rate of production of wells drilled into the formation.

40. A method according to claim 1 wherein the object of the treatment is to increase the permeability of the formation.

41. A method according to claim 1 wherein the object of the treatment is the removal of a filter cake.

42. A method according to claim 1 wherein the object of the treatment is the removal of a filter cake following a gravel packing operation.

43. A method according claim 1 wherein the object of the treatment is the removal of a biofilm.

44. A method according to claim 1 wherein the treatment fluid further includes an esterase, lipase or protease enzyme.

45. A method according to claim 1 wherein the catalyst is present in whole or in part in the brine used for drilling or workovers of the underground formation.

\* \* \* \* \*

UNITED STATES PATENT AND TRADEMARK OFFICE
CERTIFICATE OF CORRECTION

PATENT NO. : 6,702,023 B1  
DATED : March 9, 2004  
INVENTOR(S) : Harris et al.

It is certified that error appears in the above-identified patent and that said Letters Patent is hereby corrected as shown below:

<u>Title page,</u>
Item [22], PCT Filed, July 3, 2000

Signed and Sealed this

Twenty-fifth Day of May, 2004

JON W. DUDAS
*Acting Director of the United States Patent and Trademark Office*